United States Patent [19]

Rudd, Jr. et al.

[11] Patent Number: 5,081,922
[45] Date of Patent: Jan. 21, 1992

[54] DEVICE FOR CONTROLLING THE DISCHARGE OF A BALE FROM A SOLID WASTE BALING MACHINE

[75] Inventors: Brodie W. Rudd, Jr., Advance; James K. Hannah, Tobaccoville, both of N.C.

[73] Assignee: C&M Company, Winston-Salem, N.C.

[21] Appl. No.: 644,097

[22] Filed: Jan. 22, 1991

[51] Int. Cl.⁵ ........................ B30B 15/16; B30B 15/32
[52] U.S. Cl. ..................................... 100/50; 100/218; 100/232; 100/246; 100/253
[58] Field of Search ................ 100/50, 218, 232, 245, 100/246, 253

[56] References Cited

U.S. PATENT DOCUMENTS

| 1,766,642 | 6/1930 | Jacobsen et al. | 100/232 |
| 3,408,923 | 11/1968 | Bushmeyer | 100/218 X |
| 3,576,161 | 4/1971 | Wright | 100/218 X |
| 3,613,556 | 10/1971 | Wright et al. | 100/50 X |
| 3,747,516 | 7/1973 | Wood | 100/232 X |
| 4,086,850 | 5/1978 | Becker et al. | 100/232 X |
| 4,185,446 | 1/1980 | Clostermeyer et al. | 100/50 X |
| 4,658,719 | 4/1987 | Jackson et al. | 100/218 |
| 4,729,301 | 3/1988 | Smith et al. | 100/50 X |
| 4,817,520 | 4/1989 | Brown et al. | 100/50 X |
| 5,007,337 | 4/1991 | Newsom | 100/245 X |

Primary Examiner—Harvey C. Hornsby
Assistant Examiner—Stephen F. Gerrity

[57] ABSTRACT

A solid waste baling machine having a compacting chamber, a charging passage with an exit and in communication with the compacting chamber, a compacting ram head reciprocable between extended and retracted positions in the charging passage and defining in an extend position a sidewall of the compacting chamber, and a discharge passage having a discharge ram head reciprocable between extended and retracted positions in the compacting chamber and discharge passage and defining in a retracted position an end wall of the compacting chamber is provided with a discharge passage sidewall adjacent the exit end of the charging passage which is mounted for incremental lateral inward and outward movement perpendicular to the axis of the discharge passage by means of a sidewall ram to control the advance of a bale of solid waste in the discharge passage and to maintain proper positioning of the bale in the discharge passage.

5 Claims, 2 Drawing Sheets

U.S. Patent  Jan. 21, 1992  Sheet 1 of 2  5,081,922
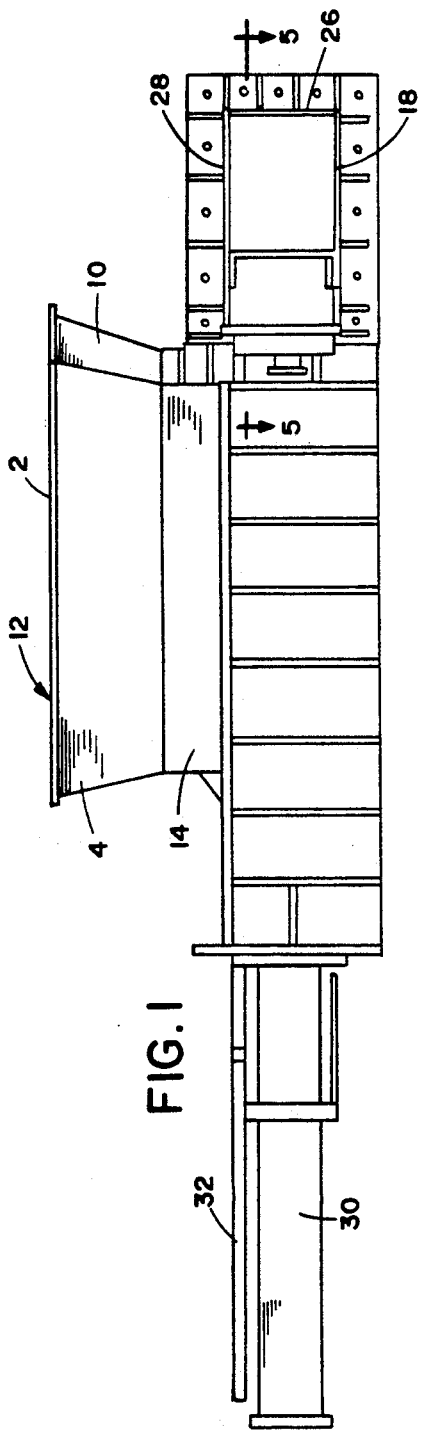
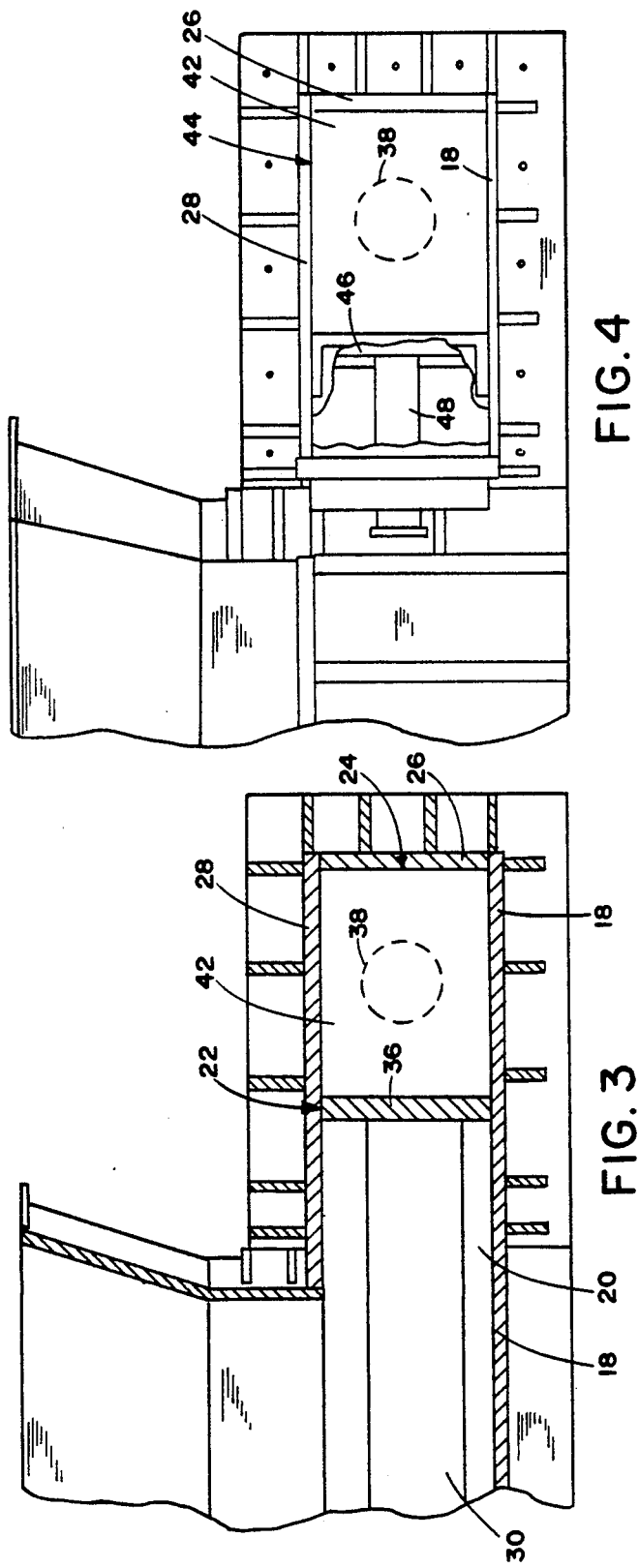

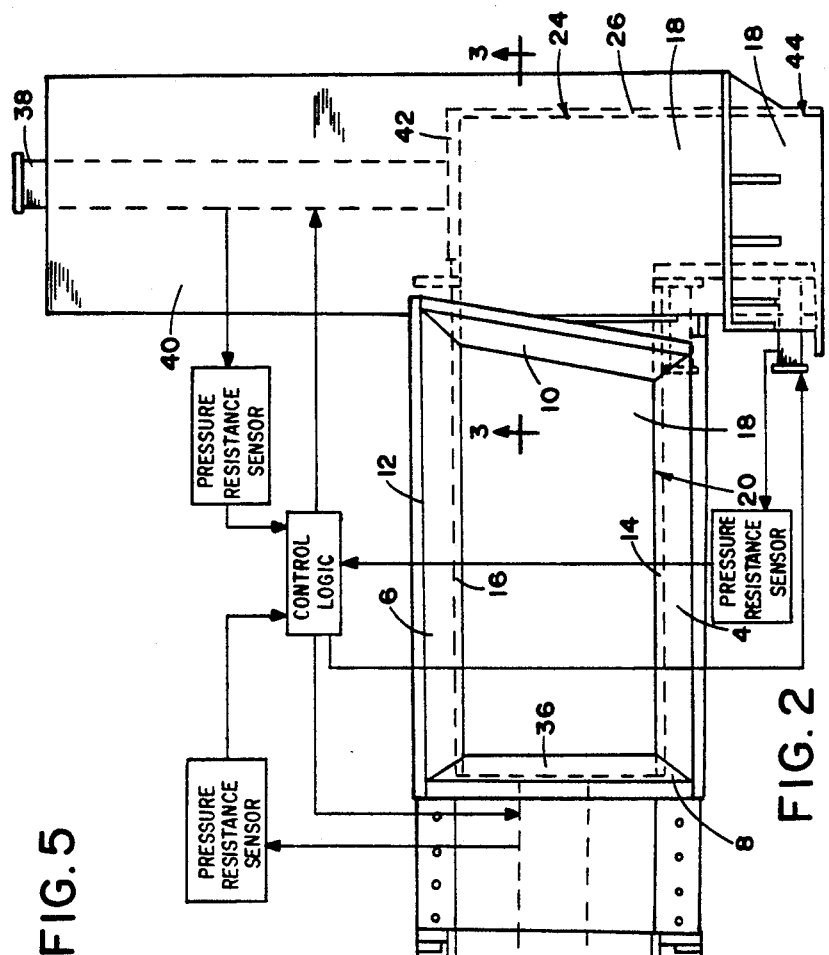
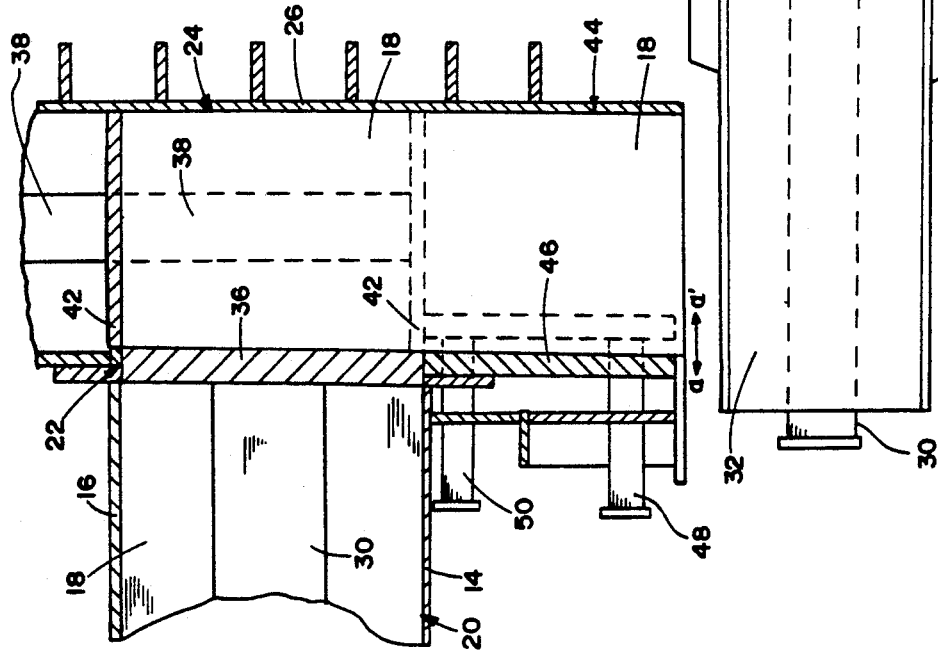

5,081,922

DEVICE FOR CONTROLLING THE DISCHARGE OF A BALE FROM A SOLID WASTE BALING MACHINE

BACKGROUND OF THE INVENTION

This invention relates to a machine for baling solid waste, including paper, non-ferrous metal, plastic, and similar solid waste materials into a compact bale.

Baling machines of this type are known in the art and generally include a bin into which solid waste is deposited, a compacting chamber in which the solid waste is compacted, and a charging passage connecting the bin and compacting chamber and having an exit end in communication with the compacting chamber. A compacting ram head, reciprocable between extended and retracted positions in the charging passage, moves the deposited solid waste through the charging passage into the compacting chamber where the solid waste is compacted into a bale by the compacting ram head in a succession of compacting strokes. After a bale is formed in the compacting chamber, it is discharged into a discharge passage in communication with the compacting chamber and perpendicular to the exit end of the charging passage by a discharge ram head reciprocable between extended and retracted positions in the compacting chamber and discharge passage. Once a bale is discharged from the compacting chamber into the discharge passage in this manner, the discharge ram head is retracted to define an end wall of the compacting chamber. At the same time, the bale in the discharge passage defines the opposing end wall of the compacting chamber to accommodate the compacting of a succeeding bale of solid waste in the compacting chamber.

In such prior art baling machines, the discharge passage generally has a fixed top, bottom and opposing sidewalls, and the bale in the discharge passage is held in position and prevented from advancing during compacting of a succeeding bale in the compacting chamber only by the frictional force between the bale in the discharge passage and the fixed top, bottom and opposing sidewalls of the discharge passage. When this frictional force is overcome by the force exerted by a succeeding bale being compacted in the compacting chamber, undesirable advance of the bale in the discharge passage occurs. This is likely to happen, for example, when the bale in the discharge passage has a high moisture content or is slightly undersized.

In one type of such prior art baling machines, provision is made to widen the discharge passage to accommodate discharge of an oversize bale. In such type of machines, the discharge passage sidewall adjacent the exist end of the charging passage is divided into inner and outer parallel sections. The outer sidewall section of the discharge passage in such machines is fixed and the inner sidewall section can be lifted out vertically to widen the discharge passage to accommodate discharge of an oversize bale from the compacting chamber. However, such devices provide no means for controlling the advance of a bale and maintaining proper positioning of a bale in the discharge passage during compacting of a succeeding bale in the compacting chamber. Further, in the normal operation of the charging and compacting functions of solid waste baling machines of this type, production of oversize bales is not likely to occur.

SUMMARY OF THE INVENTION

The present invention overcomes the problems associated with the prior art baling machines and provides a device for controlling the advance of a bale and maintaining proper positioning of a bale in the discharge passage of a baling machine during compacting of a succeeding bale in the compacting chamber.

To achieve this object, the discharge passage sidewall adjacent the exit end of the charging passage is mounted for lateral inward and outward incremental movement perpendicular to the axis of the discharge passage from a predetermined position, in alignment with the exit end of the charging passage, by at least one sidewall ram reciprocable between extended and retracted positions. Pressure is applied to a bale in the discharge passage to control the advance of the bale and maintain proper positioning of the bale through incremental inward movement of the discharge passage sidewall by extending the sidewall ram. The pressure applied by the sidewall ram through the discharge passage sidewall serves to hold the bale in position in the discharge passage against advance as a succeeding bale is being compacted in the compacting chamber.

Additionally, advance of a bale through the discharge passage by the discharge ram head is controllable by control means, responsive to resistance against extending movement of the discharge ram head, for incrementally retracting the sidewall ram when the discharge ram head is unable to advance a bale through the discharge passage because of resistance resulting from the pressure applied to the bale in the discharge passage by the sidewall ram through the discharge passage sidewall.

Further, the compacting ram head, defining a sidewall of the compacting chamber during discharge of a bale from the compacting chamber, may be retracted simultaneously with the sidewall ram by the resistance responsive control means to relieve pressure exerted by the compacting ram head on a bale in the compacting chamber to enable the discharge ram head to advance the bale from the compacting chamber into the discharge passage.

These and other objects and advantages of the present invention will become more apparent after consideration of the following detailed specification taken in conjunction with the accompanying drawings wherein like characters of reference designate like parts throughout the several views.

BRIEF DESCRIPTION OF THE DRAWINGS

FIG. 1 is a front elevational view showing a solid waste baling machine embodying a bale discharge controlling device in accordance with the present invention.

FIG. 2 is a plan view of the waste baling machine of FIG. 1.

FIG. 3 is an enlarged sectional view taken on line 3—3 of FIG. 2.

FIG. 4 is an enlarged fragmentary view of a portion of FIG. 1 with a portion thereof being broken away showing a waste baling machine embodying the present invention.

FIG. 5 is an enlarged sectional view taken along line 5—5 of FIG. 1.

DETAILED DESCRIPTION OF THE PREFERRED EMBODIMENT

Reference will now be made in detail to a preferred embodiment of the invention which is illustrated in the accompanying drawings.

A baling machine in accordance with the invention includes a bin 2 having opposing obliquely disposed sidewalls 4, 6 and obliquely disposed end walls 8, 10 defining an opening 12 at its upper portion and having at its bottom portion opposing vertically disposed sidewalls 14, 16 and bottom plate 18 defining a charging passage 20 as shown in FIGS. 1, 2. Charging passage 20 has an exit end 22 in communication with compacting chamber 24 which is in alignment with charging passage 20 as shown in FIGS. 3, 5. Compacting chamber 24 has a sidewall 26, top plate 28 and bottom plate 18, which extends from charging passage 20 into compacting chamber 24 as shown in FIG. 3.

A compacting ram 30 mounted at the end of charging passage 20 opposite exit end 22 of charging passage 20 beneath cover plate 32 has a compacting ram head 36 which is reciprocable between extended and retracted positions in charging passage 20 and defines an end wall of charging passage 20 in a retracted position, FIG. 2, and a sidewall of compacting chamber 24 at exit end 22 of charging passage 20 in an extended position, FIGS. 3, 5. A discharge ram 38 mounted exterior of compacting chamber 24 beneath cover plate 40 has a discharge ram head 42 which is reciprocable between extended and retracted positions in compacting chamber 24 and which defines an end wall of compacting chamber 24 in a retracted position, FIGS. 2, 5.

In the compacting operation, solid waste is deposited through opening 12 of bin 2 into charging passage 20 and is moved by compacting ram head 36 through exit end 22 of charging passage 20 into compacting chamber 24 where the solid waste is compacted by compacting ram head 36 into a bale. Although compacting ram 30 may be manually operated, preferably automatic control means are provided (not shown) which are programmed to actuate compacting ram 30 to accomplish the compacting operation in a succession of compacting strokes in each of which compacting ram head 36 is first fully retracted while solid waste is deposited into charging passage 20, and then compacting ram head 36 is fully extended. The automatic control means are further programmed to actuate compacting ram 30 in the final compacting stoke to cause compacting ram head 36 to be retracted only part way in order to prevent compacting of an oversize bale. While the automatic control means are normally programmed to position compacting ram head 36 at exist end 22 of charging passage 20 when compacting ram 30 is fully extended, the automatic control means may be manually overridden to extend compacting ram head 36 beyond exit end 22 to a position within compacting chamber 24, is desired.

During the compacting operation, discharge ram head 42 defines an end wall of compacting chamber 24 in a retracted position, FIGS. 2, 5. The automatic control means are further programmed to extend discharge ram 38 after a bale is compacted in compacting chamber 24, and discharge ram head 42 discharges the compacted bale into discharge passage 44 which is aligned with and in communication with compacting chamber 24. Discharge passage 44 is disposed perpendicular to exit end 22 of charging passage 20 and has top plate 28 which also defines the top of compacting chamber 24, bottom plate 18 which also defines the bottom of charging passage 20 and compacting chamber 24, and sidewall 26 which also defines a sidewall of compacting chamber 24.

The automatic control means are further programmed to extend discharge ram head 42 to a position in alignment with sidewall 14 of the charging passage 20 after a bale has been compacted in compacting chamber 24 to discharge the bale from compacting chamber 24 into discharge passage 44, FIG. 5. The automatic control means may be overridden manually, however, to further extend discharge ram head 42 beyond such alignment with sidewall 14 to a position within discharge passage 44 if desired. Once a bale is discharged from compacting chamber 24 into discharge passage 44, discharge ram head 42 is retracted to define an end wall of compacting chamber 24, and the discharged bale in discharge passage 24 defines the opposing end wall of compacting chamber 24 to accommodate the compacting of a succeeding bale of solid waste in compacting chamber 24.

In accordance with the invention, sidewall 46 of discharge passage 44 adjacent exit end 22 of charging passage 20 is mounted for lateral inward and outward incremental movement in direction a—a' perpendicular to the axis of discharge passage 44 from a predetermined position, FIG. 5, in alignment with exit end 22 of charging passage 20. The lateral movement of sidewall 46 is accomplished by at least one sidewall ram 48 mounted exterior of discharge passage 24 and connected to sidewall 46 which is reciprocable between extended and retracted positions. Preferably, a second sidewall ram 50, likewise reciprocable between extended and retracted positions simultaneously with sidewall ram 48, is mounted exterior of discharge passage 44 and connected to sidewall 46. The automatic control means are programmed to extend sidewall rams 48, 50 simultaneously to provide incremental inward lateral movement of sidewall 46 by a predetermined distance in the direction a', FIG. 5, to apply pressure to a bale in discharge passage 44 during compacting of a succeeding bale in compacting chamber 24 to control the advance of the bale in discharge passage 44 and to maintain proper positioning of the bale in discharge passage 44. The pressure applied by sidewall rams 48, 50 through sidewall 46 serves to hold the bale in discharge passage 44 in position in discharge passage 44 against advance as a succeeding bale is being compacted in compacting chamber 24.

The advance of a bale through discharge passage 44 by discharge ram head 42 is further controllable by automatic control means, responsive to resistance to extending movement of discharge ram head 42, for incrementally retracting sidewall rams, 48, 50 in direction a, FIG. 5, when discharge ram head 42 is unable to advance the bale through discharge passage 44 because of resistance resulting from the pressure applied to the bale in discharge passage 44 by sidewall rams 48, 50 through discharge passage sidewall 46. Additionally, the automatic control means can be programmed to retract compacting ram head 36, defining a sidewall of compacting chamber 24 during discharge of a bale from compacting chamber 24, simultaneously with sidewall rams 48, 50 by the resistance responsive control means to relieve pressure exerted by the compacting ram head 26 on a bale in compacting chamber 24 to enable discharge ram head 42 to advance the bale from the compacting chamber 24 into discharge passage 44.

It will be apparent to those skilled in the art that various additions, substitutions, modifications, and omissions can be made to the device of the present invention without departing from the scope or spirit of the invention. Thus, it is intended that the present invention cover the additions, substitutions, modifications, and omissions, provided they come within the scope of the intended claims and their equivalents.

What is claimed is:

1. In a solid waste baling machine of the type having a compacting chamber, a charging passage having an exit end in communication with the compacting chamber, a compacting ram head reciprocable between extended and retracted positions in the charging passage and defining in an extended position a sidewall of the compacting chamber, a discharge passage having a longitudinal axis, which discharge passage is in communication with the compacting chamber perpendicular to the exit end of the charging passage and having a sidewall adjacent the exit end of the charging passage and a discharge ram head reciprocable between extended and retracted positions in the compacting chamber and discharge passage and defining in a retracted position an end wall of the compacting chamber, the improvement wherein: the discharge passage sidewall adjacent the exit end of the charging passage is mounted for incremental lateral movement perpendicular to the longitudinal axis of the discharge passage inwardly and outwardly with respect to the discharge passage from a predetermined position in alignment with the exit end of the charging passage.

2. A device as claimed in claim 1 wherein the discharge passage sidewall is operated in movement by a first sidewall ram connected thereto, reciprocable between extended and retracted positions, and mounted exterior of the discharge passage.

3. A device as claimed in claim 2 further comprising control means responsive to resistance against extending movement of the discharge ram head for incrementally retracting the sidewall ram when the resistance reaches a predetermined level.

4. A device as claimed in claim 3 wherein the compacting ram head is retracted simultaneously with the sidewall ram by the force resistance responsive control means.

5. A device as claimed in claim 4 further comprising a second sidewall ram mounted exterior of the discharge passage, connected to the discharge passage sidewall, and operable simultaneously with the first sidewall ram.

* * * * *